United States Patent [19]

Sutton

[11] Patent Number: 4,788,893
[45] Date of Patent: Dec. 6, 1988

[54] AUTOMOBILE DOOR HANDLE OPENER

[76] Inventor: Gary C. Sutton, 7335 Carroll Ave., Takoma Pk., Md. 20912

[21] Appl. No.: 36,469

[22] Filed: Apr. 9, 1987

[51] Int. Cl.$^4$ .............................................. B25B 9/00
[52] U.S. Cl. ...................................... 81/15.9; 294/26; 7/170
[58] Field of Search ................. 81/15.9, 488; 7/161, 7/169, 170; 294/25, 26; 254/131

[56] References Cited

U.S. PATENT DOCUMENTS

| | | | |
|---|---|---|---|
| 539,690 | 5/1895 | Lasher, Jr. | 294/26 |
| 1,455,464 | 5/1923 | Welker, Jr. | 254/131 |
| 2,541,158 | 2/1951 | Gardiner | 294/12 |
| 2,739,330 | 3/1956 | Hitchcock | 294/12 |
| 4,236,427 | 12/1980 | Becnel | 81/15.9 |
| 4,587,870 | 5/1986 | Colburn | 81/15.9 |

*Primary Examiner*—Roscoe V. Parker
*Attorney, Agent, or Firm*—Joseph J. Zito

[57] ABSTRACT

A new tool for a purpose of actuating vehicle door, and other, handles, a purpose never before performed by any tool. A type of hook designed to replace one's fingertips as the operative force in opening an automobile door. The preferred embodiment has a hole (4) for attachment of a key ring and keys to serve as a handle. It may have a hinge (10), limited in the degree to which it will open by bumps (12), to make it collapsible and thereby unobstrusive when not in use. It may be made of plastic (FIGS. 8 & 9) or given a plastic or rubber coating (8) over parts that make contact with the vehicle, to prevent marring said vehicle, when the tool is made of metal. This tool is intended to be useful to women who wish to avoid damage to their real or artificial fingernails, or polish on said fingernails. It is also intended to be useful to arthritics or others similarly disabled. Further it is intended to be useful to the aforementioned categories of people in opening furniture, cabinet, and/or stove doors and drawers. Additionally it can be used by a broader class of people, that is those who wish to hang up their keys when no special rack for that purpose is available.

13 Claims, 1 Drawing Sheet

AUTOMOBILE DOOR HANDLE OPENER

BACKGROUND

Field of Invention

This invention is to be accessory to the manicurist industry as a tool for use by the consumer to prevent damage to one's fingernails when accessing opener handles. Primarily it is designed for automobile door opener handles, but may also be used to open furniture, cabinets, or stoves.

BACKGROUND

Description of Prior Art

This invention is designed primarily to overcome for the first time, any possible damage to real fingernails, artificial nails, polish, or any other manicure enhancement, in the use of a recessed, lift out automobile door opener handle.

OBJECTS AND ADVANTAGES

Accordingly I claim the following as the objects and advantages of my invention: to provide, for the first time, a tool to do that which in the past has always only been able to be done by one's fingertips, that is to go into a recessed automobile, or other vehicle, door handle and hold it securely while an upward pulling force is exerted to actuate or extend said door handle and release the door latch and further to allow the door to be swung open without otherwise touching it; to provide thereby a tool to prevent chipping, cracking, or breaking of real or artificial fingernails either by actuation of a vehicle door handle or by release or retraction of a vehicle door handle; to provide a tool to prevent the chipping of nail polish in the use of a vehicle door handle; to provide a tool to prevent the smudging of fresh nail polish in the use of a vehicle door handle; to provide a tool to prevent the pinching of fingers in the use of a vehicle door handle; to provide a tool for the disabled or handicapped to use a vehicle door handle; to provide a tool in the event that there may be, or that one has a phobia of, stinging insects or spiders nesting in a vehicle door handle; to provide a tool to open vehicle door handles without touching them with one's hand when they are hot from sitting in the sun; to provide a tool to open furniture, cabinet, and stove doors and drawers in aiding the handicapped or protecting fingernails; to provide a tool to serve as a hanger to hang up one's keys on the edge of a shelf, desk or table edge, window sill, or other convenient protuberance when a nail on the wall is not available.

Readers will find further objects and advantages of the invention from a consideration of the ensuring description and the accompanying drawings.

DRAWINGS FIGURES

FIG. 1 perspective of device in use, inserted under open edge of recessed vehicle door handle.

FIG. 2 vertical section through device inserted in door opener handle showing upward action.

Figure 9:
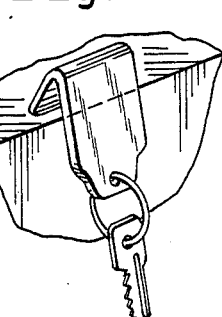
Figure 4:
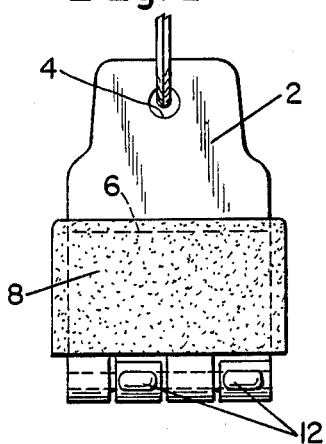
FIG. 4 shows a front elevation view.
Figure 10:
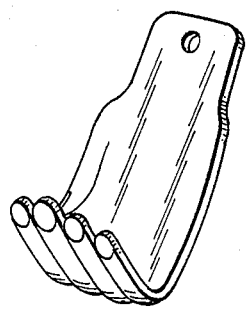
Figure 6:
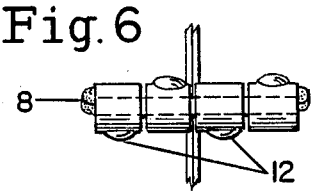
FIG. 6 shows a bottom plan view.
Figure 5:
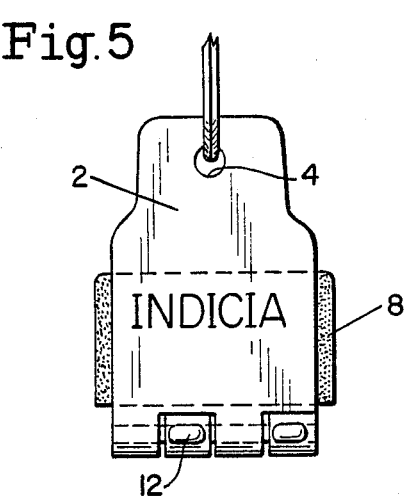
FIG. 5 shows a rear elevation view.

FIG. 9 one piece plastic construction shown operating as a keyring hanger.

DRAWING REFERENCE NUMERALS 2 body
4 hole in body for key ring
6 contact edge or point of hook structure
8 rubber or plastic covering for hook edge
10 hinge
12 bumps on hinge to restrict opening

DESCRIPTION

Figure 7:
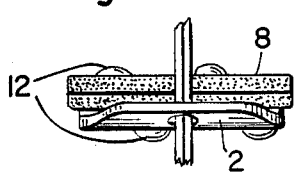
FIG. 7 shows a top plan view.
Figure 8:
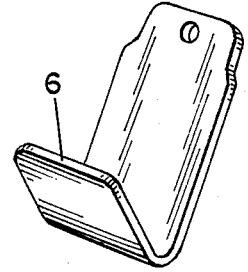
FIG. 8 shows perspective of modified form, one piece plastic construction.

This tool is basically a broadened, flattened hook that is attached to a key ring. FIGS. 1 through 7 show the more elaborate metal construction with collapsing hinge and protective rubber or plastic covering. FIGS. 7 and 8 show the one piece plastic construction, preferred for its ease and low cost of manufacture. The body 2 which is essentially the shank of the hook could be elongated in another embodiment to be also a handle. The hole 4 in the body 2 allows for the keys and the key ring to be the handle in addition to assuring that it is always there after unlocking the vehicle door. The contact edge or point of hook structure 6 is the same width as the body 2 although it is shorter in height measuring from the hinge 10 upward. The contact edge or point of hook structure 6 has a covering 8 of rubber or plastic which extends all the way down to the hinge 10 and may also be made to cover the hinge on the front side. Protruding from the hinge 10 are four bumps 12 which limit how far the hinge 10 will open.

OPERATION

Figure 1:
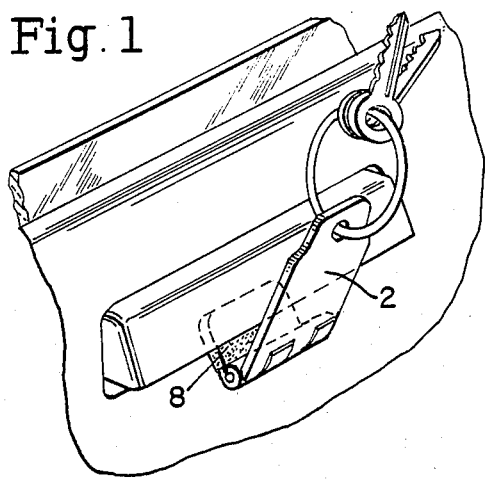
Figure 2:
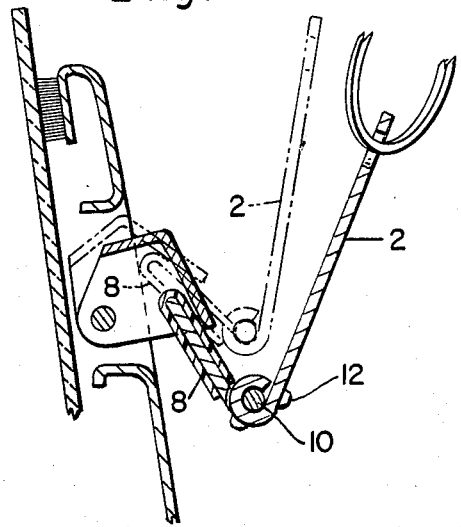
Figure 3:
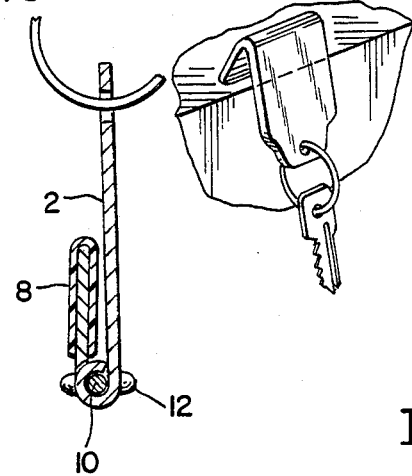
FIG. 3 shows a vertical section of the device in the folded position.

The operation of this hook type tool is quite simply that of grasping and holding pull actuated, recessed, exterior or interior automobile, or other, door or drawer handles, while held in the hand by its key ring and keys attached, shown in FIG. 1, or by its body 2 that may be elongated into a handle. A hole 4 in the upper center of the body 2 allows for the attachment of the key ring. The contact edge or point of hook structure 6 makes the actual holding and gripping contact with the door handle, FIG. 1 showing tool inserted in door handle, FIG. 2 showing upward pulling action. The covering 8 of contact edge or point of hook structure 6 operates as protection against scratching of automobile surfaces. The covering 8 of rubber or plastic also serves to widen contact edge or point of hook structure 6 to allow for easier gripping when opening hinge 10 from the closed position which allows the tool to be more compact and less likely to hang up when removing it from one's purse. The four bumps 12 on hinge 10 function to limit the opening of the hinge 10 to approximately forty five degrees.

While the above description contains many specificities, one should not construe these as limitations on the scope of the invention, but rather as exemplifications of preferred embodiments thereof. Those skilled in the art will envision many other possible variations that are within its scope. For example skilled artisans will readily be able to change the dimensions and shapes of the various embodiments. They will also be able to make the automobile door handle opener of alternative materials, such as wood. They can revert to the traditional hook shape of a curved rod and give it a blunt as opposed to the traditional sharp point. They can make it attached to a bracelet as opposed to a key ring. They can elongate the body into a handle. Accordingly, the scope of the invention should be determined not by the embodiments illustrated, but by the appended claims and their legal equivalents.

I claim:

1. A tool comprising:
   a hook means for engaging an opener handle operatively attached to a mechanically actuatable mechanism, and
   a body for holding said tool and applying force to operate said opener handle to actuate said mechanism.

2. The tool of claim 1 wherein; said body is longer than said hook.

3. The tool of claim 1, wherein;
   said body and said hook are of approximately equal length.

4. A tool comprising:
   a hook means for engaging an opener handle, and
   a body for holding said tool and applying force to actuate said opener handle, wherein:
   said hook means is comprised of an essentially planer member pivotally attached to said body.

5. A tool comprising:
   a hook means for engaging an opener handle, and
   a body for holding said tool and applying force to actuate said opener handle, wherein;
   a hole is provided in said body for the attachment of a keyring so that a keyring attached to said body augments said body to provide for greater application of force.

6. The Tool of claim 5, wherein
   said hook means is configured for grasping and hanging from a shelf, window sill, desk or table top, or other convenient protuberance, 7. A tool for assisting in the opening of a door through actuation of a door latch, wherein the door latch is of the lever-actuated type, having a pivotal axis, an actuating handle operatively connected to said pivotal axis and a latching/releasing mechanism operatively connected to said handle and actuated through movement of said handle about said pivotal axis, comprising;
   a body,
   hook means attached to said body and configured for engaging said handle, wherein,
   force applied to said body is transmitted to said hook means and transferred to said handle to actuate said door latch through pivoting of said handle.

8. The tool of claim 7, wherein;
   said handle and said hook are of essentially equal length.

9. The tool of claim 7, wherein;
   said hook means is formed by the opening of a hinge with a limited degree of travel.

10. The tool of claim 7, wherein;
    said body is provided with an aperture configured for the insertion of a rigid object to provide for the application of a greater quantity of linear force to said body.

11. The tool of claim 7, further comprising;
    a keyring attached to said body, providing an increased portion of said tool for the application of said linear force to said tool.

12. A method for opening a door having a lever actuated latch with a pivotal axis, an actuating handle operatively connected to said pivotal axis and a latching/releasing mechanism operatively connected to said handle, comprising the steps of;
    providing a hooked tool,
    engaging said handle with said hooked tool,
    applying operative force to said hooked tool to rotate said handle about said pivotal axis,
    releasing and latching/releasing mechanism through said handle rotation, and
    opening said door through continued application of said operative force.

13. The method of claim 12, wherein said hooked tool is comprised of a backscratcher formed in the shape of a miniature hand.

* * * * *